Dec. 18, 1934.   J. W. MENHALL   1,985,222
PROTECTIVE COVERING FOR AUTOMOBILE SEATS
Filed Dec. 1, 1933
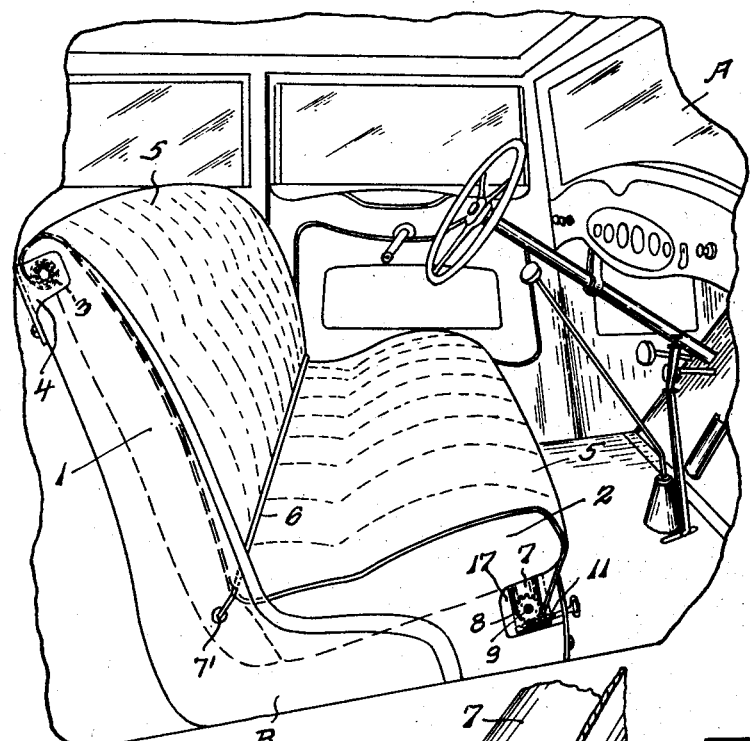
Fig. 1.
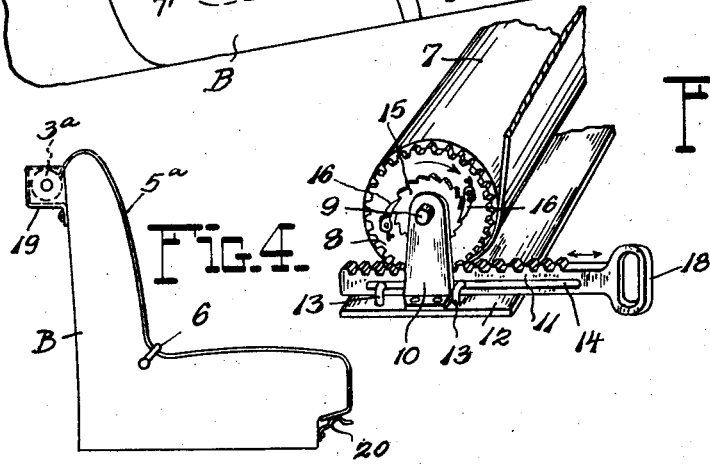
Fig. 2.
Fig. 4.
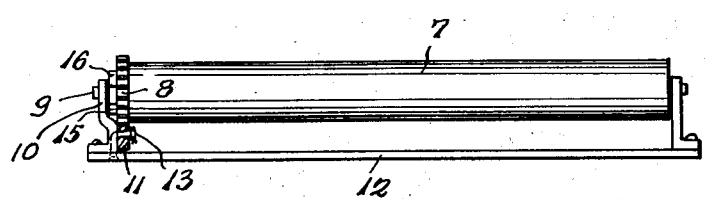
Fig. 3.
Inventor
JAMES W. MENHALL.
By Robert Cobb
Attorneys Patented Dec. 18, 1934

1,985,222

UNITED STATES PATENT OFFICE 1,985,222

PROTECTIVE COVERING FOR AUTOMOBILE SEATS

James W. Menhall, Edgerton, Wis.

Application December 1, 1933, Serial No. 700,604

2 Claims. (Cl. 155—182)

The present invention deals with the objective of providing an auxiliary adjustable and renewable covering for the protection of the upholstery of the seats of automobiles. It is well known that a rather fine grade of upholstery is being used in the construction of nearly all passenger automobiles at present being produced in this country. To avoid soiling of the upholstery, recourse is frequently had to providing detachable covers of suitable cloth or fabric material. These covers are washable and readily applied and removed.

It is the purpose of my invention to equip the automobile seat, whether the front seat, the rear seat, or the only seat of the car, at the seat and back portion thereof, with a temporary protective covering, preferably of paper, this covering to be susceptible of being drawn off of a supply roll and pulled into place over the back and seat cushions of the seat structure, and being suitably held in place.

The material from which the protective covering of my invention is made, may be other than paper, though I employ the latter preferably because it is cheap, and because it enables ready renewal of the portion of the covering which is being used after it has become soiled.

If desired, the covering material used by me may be of a color that conforms with the color of the general upholstery used in the car.

In carrying out my invention, I equip the seat structure preferably at the rear portion of the back thereof with a supply roll of paper, or equivalent material. From this roll the covering is drawn out and down over the back cushion of the seat structure, and then into cooperation with a guide means from whence it is led over the seat cushion of the seat structure, and suitably fastened at the lower front portion of the latter.

I contemplate within my invention the use of simple actuating appliances for moving the paper or other material comprising the protective covering to facilitate the renewal of the covering in respect to that portion which may become worn, soiled, or torn in the constant use of the motor vehicle.

In the accompanying drawing:—

Figure 1 is a fragmentary perspective view of the interior front portion of the passenger vehicle, such as an ordinary automobile and illustrates my preferred adaptation of my invention.

Figure 2 is a fragmentary perspective view illustrating one of the actuating appliances used for feeding fresh portions of the covering into position for use.

Figure 3 is a view in elevation showing more fully the lower feed roll construction and actuating appliances.

Figure 4 is a side elevation view of a modified adaptation of the invention.

Describing the invention specifically, A denotes the motor vehicle in which is provided the usual front seat structure designated B. This seat structure includes the back cushion 1 and the seat cushion 2. I preferably make the frame of the back of the seat structure of such construction as to provide a compartment in which is mounted the supply roll 3 carried by brackets 4 and freely rotatable in said brackets. The roll is practically hidden from view because the rear sides of the brackets 4 close the space that leads to the compartment in which the roll 3 is mounted, or the rear opening. The roll 3 is adapted to carry the protective covering 5 which is rolled thereabout and which is preferably made of paper.

From the roll 3 the covering material 5 is caused to pass up and over the top of the back of the seat structure B down over the back cushion 1, and thence beneath a floating pivotally mounted guide rod 6, the pivoted extremities of which are designated 7'. This guide rod is in the nature of a bail and after the covering 5 has been led under this guide member and over the top of the seat cushion 2, it is rolled about a feed roll 7, seen best in Figures 1 and 2. The feed roll 7 is susceptible of being actuated readily in order to cause the covering 5 to roll around the same. For this purpose, at one or both ends of the feed roll is located a gear 8 rotatable upon the pintle member or journal 9 by which the roll is mounted in the adjacent supporting bracket 10. The teeth of the gear 8 mesh with a rack 11 slidably mounted upon a base plate 12 and suitably guided by members 13 carried by said base plate which members 13 enter a slot 14 in the said actuating slide 11. Secured to rotate with the journal or journals 9 is a ratchet wheel 15, and the gear 8 carries pawls 16 normally engaging the teeth of said ratchet wheel.

The feed roll 7 is preferably mounted in a compartment 17 beneath the cushion 2 and at the front of the seat structure, and by reason of the fact when the protective covering 5 is rolled on the roll 7, the rolled paper thus caused to be carried by the roll 7 is hidden from view.

In the operation of my invention, as above described, it is obvious that by pushing in the handle 18 of the slide 11, the roller 7 is actuated and will cause the paper or other material of the covering 5 to roll thereabout in an easy manner in the action of supplying a fresh portion of the covering 5 to the exposed portions of the upholstery of the cushions 1 and 2. Of course, there would be sufficient covering material 5 rolled about the supply roller 3 so that one supply of this covering will last a considerable period, even though the covering 5 is pulled downward and over the seat cushions a number of times.

In Figure 4 I have illustrated a slight modification of my invention, wherein it is readily applicable to automobiles at present in use. In this construction the supply roll of the covering 5a is designated 3a and is mounted in a box-like chamber 19 attached to the rear of the back portion of the seat structure B. The covering 5a is susceptible of being pulled out of this box-like casing through a slot at the top of the latter, and will be adjusted over the cushions 1 and 2 in the manner previously described, excepting that in this construction I do not employ the feed roller 7 and the actuating devices therefor. Rather do I rely in this instance upon merely pulling the protective covering 5a down over the cushions 1 and 2 by hand, the free edge of the covering then being held at the lower front portion of the seat structure B by spring pressure fingers 20. Under these conditions, the portion of the covering which I renewed by pulling out of the compartment 19, a fresh section, will be torn off, and thrown away in an obvious manner.

Of course, it will be obvious that in connection with passenger busses or vehicles of that type, generally, the invention may be applied to each seat of the vehicle, and indeed, the invention is susceptible of employment in ordinary railroad cars which are equipped with seats, the cushions of which may be desired to be preserved or kept from soiling as respects the upholstery applied thereto.

I might note that if desired since there is greater wear on the protective covering 5 at the portion of the seat structure where the driver of the car sits, said protective covering 5 may be made in right and left sections dividing the space of the cushions 1 and 2 about equally. Under these conditions, I would provide two separate feed rollers each individually operable, and likewise two supply rollers 3, thus the portion of the protective covering 5 over the driver's seat cushion and back cushion could be renewed more frequently than the other portion which will not have to sustain the same amount of wear and use.

Having thus described my invention, what I claim as new and desire to secure by Letters Patent of the United States, is:—

1. In protective covering means for the seats of automobiles, railroad cars or the like, in combination, a seat structure comprising a back having a back cushion and a seat having a seat cushion, a housing mounted within the upper rear portion of the back, a supply roll of covering material within said housing and adapted to pass from the same over and down the back cushion and over the seat cushion, guide means between said cushion and the seat cushion hingedly mounted to said seat structure, and appliances at the lower front portion of the seat carrying the seat cushion for holding the said protective covering from displacement, said appliances including a feed roll extending over the entire width of the seat structure, and manual means for turning said roll to pull a fresh section of the protective covering from the supply roll for use over the seat and back cushions.

2. In protective covering means for the seats of automobiles, railroad cars, or the like, in combination, a seat structure comprising a back having a back seat cushion and a seat having a seat cushion, a housing mounted within the upper rear portion of the back, a supply roll of covering material within the said housing, the said covering material extending over the back cushion and seat cushion, guide means between said cushions and hingedly mounted on said seat structure, and instrumentalities within the lower front end portion of the seat carrying the seat cushion for holding the said protective covering from displacement, said instrumentalities comprising a base member, a plurality of brackets on said base member, a shaft rotatively mounted between said brackets, a roll mounted on said shaft, a ratchet rigidly mounted on said shaft, a spur gear rotatively mounted on the shaft, manual operating means for the spur gear, pawls on the spur gear for interconnecting the ratchet and spur gear when said spur gear is rotated in one direction for rotation of the roll to pull a fresh section of protective covering from the supply roll for use over the seat and back cushions, and instrumentalities for connecting the manual operating means to said base and for guiding the same with respect thereto.

JAMES W. MENHALL.